(12) United States Patent
Sanders et al.

(10) Patent No.: US 6,276,005 B1
(45) Date of Patent: Aug. 21, 2001

(54) WATER RECYCLING DEVICE

(76) Inventors: Mark G. Sanders, 225 Abraham Flexner Way, Suite 800, Louisville, KY (US) 40202; Matt Ridge, 819 Foxwood Ave., Louisville, KY (US) 40223

( * ) Notice: Subject to any disclaimer, the term of this patent is extended or adjusted under 35 U.S.C. 154(b) by 0 days.

(21) Appl. No.: 09/599,318

(22) Filed: Jun. 22, 2000

Related U.S. Application Data

(60) Provisional application No. 60/142,110, filed on Jul. 2, 1999.

(51) Int. Cl.[7] .................................................... A47K 4/00
(52) U.S. Cl. ........................ 4/665; 4/668; 4/669; 137/403
(58) Field of Search ................................. 4/665, 668, 669, 4/317, 359, 397, 402, 403; 137/403

(56) References Cited

U.S. PATENT DOCUMENTS

| | | | |
|---|---|---|---|
| 616,995 | * | 1/1899 | Wangelin ............................. 137/403 |
| 926,842 | * | 7/1909 | Bartlett ................................. 137/403 |
| 1,581,158 | * | 4/1926 | Beach ................................... 137/403 |
| 3,477,408 | * | 11/1969 | Mull ..................................... 137/403 |
| 5,243,719 | | 9/1993 | McDonald et al. . |
| 5,251,346 | | 10/1993 | Donati . |
| 5,303,728 | | 4/1994 | Senatore . |
| 5,341,529 | | 8/1994 | Serrano . |
| 5,845,346 | | 12/1998 | Johnson, Jr. . |

FOREIGN PATENT DOCUMENTS

| | | | |
|---|---|---|---|
| 004037389 | | 5/1992 | (DE) . |
| 2087943 | * | 6/1982 | (GB) ....................................... 4/665 |
| 0300427 | | 12/1990 | (JP) . |

* cited by examiner

Primary Examiner—David J. Walczak
Assistant Examiner—Khoa D. Huynh
(74) Attorney, Agent, or Firm—Theresa Fritz Camoriano; Camoriano and Associates

(57) ABSTRACT

A water recycling device, wherein gray water from a bathroom sink is reused to flush a toilet. The device includes a gray water reservoir, means for sensing the level of water in the toilet tank, a pump to transfer water from the gray water reservoir to the toilet tank, and a mechanical means to stop the normal potable water supply from filling the toilet water tank as long as sufficient water is being supplied from the gray water reservoir. The mechanical means physically holds the float valve of the fresh water line closed by holding the float in the up position, unless there is no flow of gray water into the toilet's tank, in which case the float is released, allowing the normal potable water supply to fill the tank.

20 Claims, 1 Drawing Sheet

WATER RECYCLING DEVICE

This application claims priority from U.S. Provisional Application Ser. No. 60/142,110, filed Jul. 2, 1999, which is hereby incorporated by reference.

BACKGROUND OF THE INVENTION

The present invention relates to a water recycling device, and, more specifically, to a simple apparatus for using gray water generated in a bathroom sink to fill a toilet tank.

Water scarcities in some areas are so severe that water either is very expensive or is rationed. In those situations, people seek ways to re-use gray water from sinks, showers, and washing machines for other purposes, such as to flush toilets. Many such recycling systems have been devised, but most are expensive and require extensive changes to the plumbing of the building. Since there is an enormous population of existing, installed toilets, and this installed population is intertwined with existing household plumbing systems, it would be desirable to have a device for recovering gray water which would be universal in its application, inexpensive, easy to install, effective in its use, simple to operate, and safe in that it does not allow any possibility of contaminating the fresh water supply with the recovered gray water to be reused.

It is therefore the object of the present invention to provide a device that is inexpensive to manufacture, is easily retrofitted to installed toilets, and which does not allow for the mixing of gray water and the fresh water supply, should any part of the device fail.

It is a further object of the present invention to provide a device that will consistently serve its purpose, and do so in a seamless manner to the end user. That is, the end user will be totally unaware of the presence and usage of this water recycling device after it is installed, since the method of operation of the sink and of the toilet will remain exactly the same with or without the presence of this water recycling device. There is no special training required in order to use the water recycling device, and no special instructions need to be followed.

These and other objects and advantages of the present invention will become apparent upon review of the following description.

SUMMARY OF THE INVENTION

The purpose of the present invention is to provide a gray water recycling device for flushing of toilets. In a preferred embodiment, a reservoir under the bathroom sink (or any other source of gray water such as showers, dishwashers, or clothes washers) collects the gray water to be reused. The water falls into a trap section of the reservoir where it either overflows into the main section of the reservoir after passing through a simple barrier filter, or it overflows into the city sewer drain, if the reservoir is already full.

A small water pump transfers the gray water from this reservoir to the toilet's water tank (and it may also pump water directly to the toilet tank overflow to fill the toilet bowl). This pump has a float switch, so that the pump will not run if the water level in the reservoir is too low, thus protecting the pump from damage when there is not enough water in the reservoir.

The toilet's water tank is retrofitted with a seesaw mechanism which pivots about a pivot point. On one side of the pivot point is a lift arm, which extends out and physically supports the toilet's float valve, holding the toilet's float valve in the up or closed position as long as there is water pushing down on another arm, which is on the other side of the pivot point.

A float switch in the toilet water tank sends a signal to start the pump in the reservoir as soon as the water in the toilet tank drops. Thus, when the toilet is flushed, the water level drops, signaling the pump to start pumping gray water from the reservoir. This gray water falls into a balance tube receptacle arm on the opposite side of the pivot point from the lift arm, weighing down this arm of the seesaw mechanism, thus forcing up the lift arm of the seesaw mechanism, which holds the toilet's float valve in the closed position. The balance tube receptacle includes a first tube and a weight cup adjacent to the first tube to provide more of a moment arm for pivoting, and both the first tube and the weight cup have a small hole at the bottom, so that they leak a small amount of water.

As long as gray water is being pumped from the reservoir, the float valve is held in the closed position, not permitting regular fresh water to enter the toilet's water tank. If the gray water stops flowing in (because there is not enough gray water in the reservoir or because of some other reason, such as a pump failure), the water leaks out of the balance tube receptacle, and the balance tube receptacle no longer has sufficient weight to hold the first pivot arm up. The float valve will then drop, and it will allow normal fresh water to fill the toilet's water tank.

A float tube is attached to the balance tube receptacle, which causes the balance tube receptacle to move to a substantially upright position when the toilet's water tank is full.

DESCRIPTION OF THE PREFERRED EMBODIMENT

Figure 1:
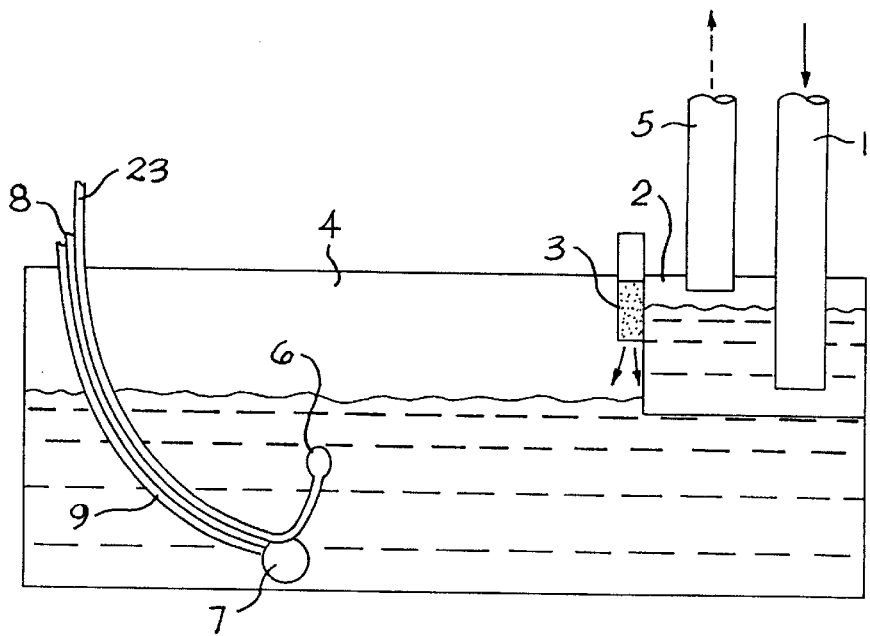
FIG. 1 is a schematic view of the reservoir portion of the present invention, which receives gray water from the bathroom sink drain.

As shown in FIG. 1, there is a main gray water reservoir 4, which fits conveniently in the bathroom, preferably under the sink. The reservoir 4 preferably is molded from plastic. In the upper portion of the reservoir 4 is a separate compartment that serves as a trap area 2. A filter 3 is located in the passage between the trap area 2 and the reservoir 4. Water is introduced into the trap area 2 by a flexible hose 1, which is connected to the extension tube of a standard lavatory drain (not shown). So, when a person washes his hands in the bathroom sink, the water flows down the drain, through the hose 1, and into the trap area 2. As the water begins to fill up the trap area 2, it overflows through the filter 3 into the main reservoir 4. A drain hose 5 is provided so that, if the reservoir begins to overfill, the extra water will flow out of the drain hose 5 to the house drain line (not shown).

A pump 7 is provided to pump water from the reservoir 4 to the toilet tank 10. There is a secondary switch 6 in the reservoir, which is a float similar to the type of float found on sump pumps. This float switch 6 must be floating in order for the pump 7 to be activated. If the water level in the reservoir 4 is low, so that the float switch 6 is not floating, then the pump 7 cannot be activated. The pump 7 requires a standard 110 volt AC power supply. When the pump 7 is activated, as will be described below, it pumps water from the reservoir 4 through two hoses 8, 9 to the toilet tank 10, shown in phantom in FIG. 2.

Figure 2:
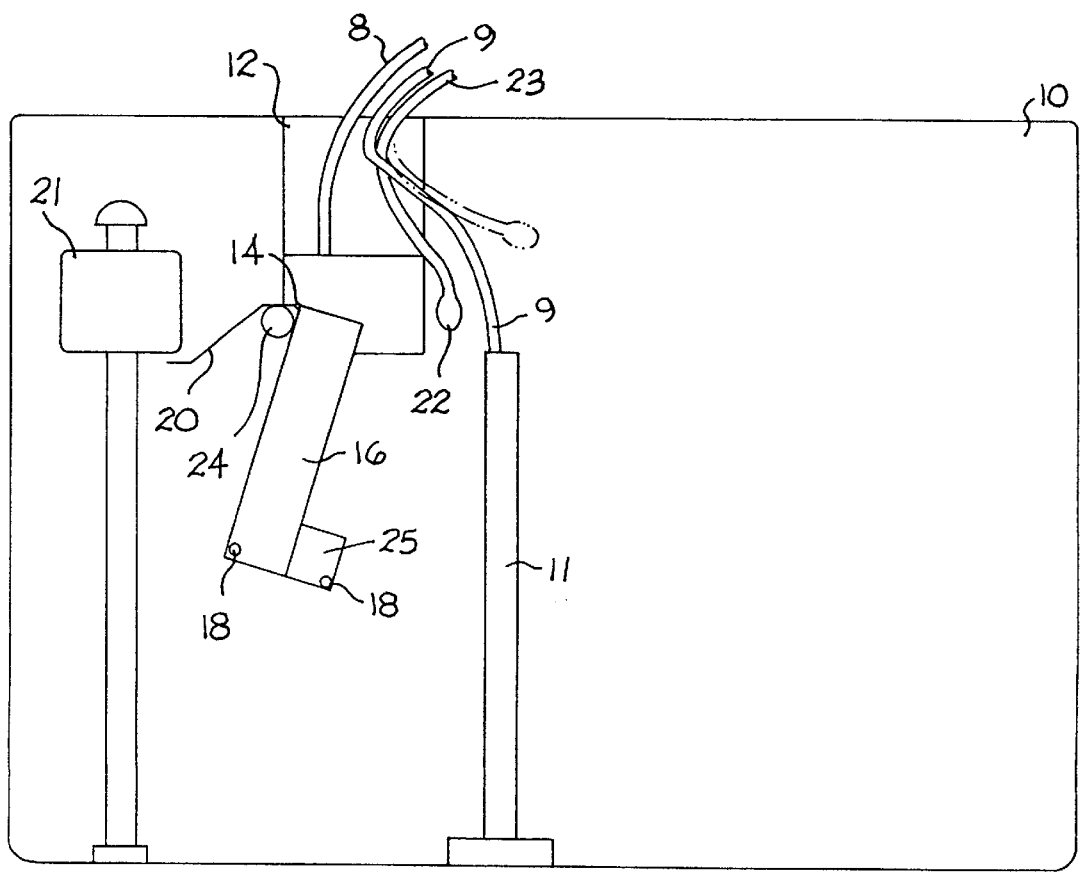
FIG. 2 is a schematic view of a toilet tank, including portions of the present invention.

Looking now at FIG. 2, the first hose 8 goes to a first arm which includes the balance tube receptacle 16, and the second hose 9 goes directly into the toilet tank overflow 11 to fill the toilet bowl. There is a bracket 12, which hangs on the inside of the toilet tank 10 and is thereby fixed to the toilet tank 10. The balance tube 16 is mounted on the bracket 12 by means of a pivot pin 14, so that the balance tube 16 pivots about the pivot pin 14 relative to the bracket 12 and relative to the toilet tank 10. When the balance tube 16 (and weight cup 25) are filled with water, they pivot clockwise, as shown in FIG. 2. The balance tube 16 has an open top for receiving water from the hose 8 and has a small hole 18 at the bottom so that it leaks a small amount of water. The weight cup 25 similarly has an open top and a small hole in the bottom. A control arm 20 is fixed to the balance tube arm 16 so that it pivots with the balance tube 16 and weight cup 25 about the pivot pin 14. When the balance tube 16 is filled with water, it causes the control arm 20 to pivot upwardly. The control arm 20 contacts the regular toilet float 21 in the toilet tank 10 and holds the toilet float 21 up, in he closed position, thereby preventing normal fresh water from entering the toilet tank 10 as long as there is sufficient water coming from the reservoir 4. If the toilet tank 10 is empty and water is not filling the balance tube and weight cup from the reservoir 4, the balance tube 16 and weight cup 25 will lose most of their water through the drain holes 18, and the weight of the float 21 and the control arm 20 will cause the balance tube arm 16 to pivot counterclockwise (as seen from the vantage point of FIG. 2), allowing the float 21 to move down, and allowing the normal fresh water to enter the toilet tank 10.

There is a primary float switch 22 in the toilet tank, which is connected to the pump 7 by an electrical line 23. If the toilet is flushed, so that the tank 10 empties, the float switch 22 signals the pump 7 to begin pumping. If there is sufficient water in the reservoir 4 for the secondary float switch 6 in the reservoir to be activated, then, when the primary float switch 22 in the toilet tank 10 shifts downwardly, it will cause the pump 7 to turn on and will fill the toilet tank 10 by filling and overflowing the balance tube 16, thereby keeping the regular toilet tank float 21 in the raised position by means of the control arm 20. There is a float 24 connected to the balance tube 16, which ensures that the balance tube 16 will return to its normal working position as the toilet tank fills with fresh water.

It will be obvious to those skilled in the art that modifications may be made to the embodiment described above without departing from the scope of the present invention.

What is claimed is:

1. A water recycling device, comprising:
   a gray water reservoir;
   a toilet water tank including a float valve which controls incoming potable water to said tank;
   a gray water supply line having an inlet at said gray water reservoir and an outlet into said toilet water tank; and,
   a pivoting seesaw mechanism mounted in said toilet water tank, said seesaw mechanism including first and second arms mounted so as to pivot together about a pivot point fixed relative to said toilet water tank, wherein said first arm includes a receptacle which receives water from said gray water supply line outlet, and said second arm cooperates with said float valve so that, when said first arm receptacle is filled with water, the weight of the water pivots said second arm into position to maintain said float valve in a closed position.

2. A water recycling device as recited in claim 1, wherein said gray water supply line is pressurized by means of a pump.

3. A water recycling device as recited in claim 2, and further comprising a level switch in the toilet water tank which activates said pump.

4. A water recycling device as recited in claim 1, wherein said gray water reservoir includes an overflow line which overflows to a drain.

5. A water recycling device as recited in claim 1, wherein said receptacle on said first arm of said pivoting seesaw mechanism has a small hole in the bottom to allow water to slowly leak out.

6. A water recycling device as recited in claim 5, and further comprising a float attached to said seesaw mechanism so as to urge said first arm into a substantially vertical orientation when said float is in floating contact with water in said toilet water tank.

7. A water recycling device, comprising:
   a gray water reservoir disposed to receive and collect gray water from a gray water source;
   a toilet, including a toilet water tank and a toilet float valve to control incoming potable water to said tank;
   a pump;
   a gray water line in communication with said pump, said gray water reservoir, and said toilet water tank, such that said pump transfers gray water from said gray water reservoir to said toilet water tank through said gray water line;
   a level sensing mechanism in said toilet water tank which activates said pump hen the water level in said toilet water tank is low, and which shuts off said pump when the water level in said toilet water tank is high;
   and a pivoting seesaw mechanism mounted in said toilet water tank and including a first arm including a balance tube and a second arm in communication with said toilet float valve, such that, when the water level in said toilet water tank drops, said level sensing mechanism activates said pump to pump gray water from said reservoir to said balance tube through said gray water line, causing said second arm to maintain said toilet float valve in a closed position.

8. A water recycling device as recited in claim 7, wherein said gray water source is bathroom sink, and said reservoir is located beneath the bathroom sink.

9. A water recycling device as recited in claim 7, wherein said gray water reservoir includes a main reservoir and a trap compartment which overflows into the main reservoir through a filter.

10. A water recycling device as recited in claim 7, wherein said gray water reservoir has an overflow connection to a drain line.

11. A water recycling device as recited in claim 7, wherein said gray water line includes two hoses, one of said hoses leading from said gray water reservoir to a toilet tank overflow line and the other of said hoses extending from said gray water reservoir to said balance tube.

12. A water recycling device as recited in claim 7, wherein said balance tube includes a drain hole such that, when said toilet is flushed, if no gray water is transferred into said balance tube, the water in said balance tube drains out through said drain hole and said balance tube loses its water weight such that said pivoting seesaw mechanism is unable to maintain said toilet float valve in said closed position.

13. A water recycling device as recited in claim 7, wherein said pivoting seesaw mechanism further comprises a balance tube float which urges said balance tube into a substantially vertical orientation when said blance tube float is in floating contact with water in said toilet water tank.

14. A water recycling device, comprising:
- a gray water reservoir;
- a toilet water tank including a float valve which controls incoming potable water to said tank;
- a gray water supply line having an inlet at said gray water reservoir and an outlet into said toilet water tank; and,
- a pivoting seesaw mechanism mounted in said toilet water tank, said seesaw mechanism including first and second arms mounted so as to pivot together about a pivot point fixed relative to said toilet water tank, wherein said first arm includes a receptacle which receives water from said gray water supply line outlet, and said second arm cooperates with said float valve so that, when said first arm receptacle is filled with water, the weight of the water pivots said second arm upwardly, exerting an upward force on said float valve.

15. A water recycling device as recited in claim 14, wherein said gray water supply line is pressurized by means of a pump.

16. A water recycling device as recited in claim 15, and further comprising a level switch in the toilet water tank which activates said pump.

17. A water recycling device as recited in claim 14, wherein said receptacle on said first arm of said pivoting seesaw mechanism has a small hole in the bottom to allow water to slowly leak out.

18. A water recycling device as recited in claim 17, and further comprising a float attached to said seesaw mechanism so as to urge said receptacle into a substantially vertical orientation when said float is in floating contact with water in said toilet water tank.

19. A water recycling device, comprising:
- a gray water reservoir disposed to receive and collect gray water from a gray water source;
- a toilet, including a toilet water tank and a toilet float valve to control incoming potable water to said tank;
- a pump;
- a gray water line in communication with said pump, said gray water reservoir, and said toilet water tank, such that said pump transfers gray water from said gray water reservoir to said toilet water tank through said gray water line;
- a level sensing mechanism in said toilet water tank which activates said pump when the water level in said toilet water tank is low, and which shuts off said pump when the water level in said toilet water tank is high;
- and a pivoting seesaw mechanism mounted in said toilet water tank and including a first arm including a balance tube and a second arm in communication with said toilet float valve, such that, when the water level in said toilet water tank drops, said level sensing mechanism activates said pump to pump gray water from said reservoir to said balance tube through said gray water line, causing said second arm to exert a lifting force on said toilet float valve.

20. A water recycling device as recited in claim 19, wherein said gray water reservoir includes a main reservoir and a trap compartment which overflows into the main reservoir through a filter.

\* \* \* \* \*

UNITED STATES PATENT AND TRADEMARK OFFICE
CERTIFICATE OF CORRECTION

PATENT NO.   : 6,276,005 B1                                      Page 1 of 1
DATED        : August 21, 2001
INVENTOR(S)  : Mark Golightly Sanders and Matt Ridge It is certified that error appears in the above-identified patent and that said Letters Patent is hereby corrected as shown below:

Column 3,
Line 23, delete "he" and insert therefor -- the --.

Claim 7,
Line 34, delete "hen" and insert therefor -- when --.

Signed and Sealed this

Twelfth Day of March, 2002

Attest:

Attesting Officer

JAMES E. ROGAN
Director of the United States Patent and Trademark Office